(12) United States Patent
Ma

(10) Patent No.: US 11,480,395 B2
(45) Date of Patent: Oct. 25, 2022

(54) METHODS AND SYSTEMS FOR THERMAL ENERGY STORAGE AND THEIR USE IN BUILDINGS APPLICATIONS

(71) Applicant: Alliance for Sustainable Energy, LLC, Golden, CO (US)

(72) Inventor: Zhiwen Ma, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 17/386,759

(22) Filed: Jul. 28, 2021

(65) Prior Publication Data

US 2022/0034598 A1 Feb. 3, 2022

Related U.S. Application Data

(60) Provisional application No. 63/057,715, filed on Jul. 28, 2020.

(51) Int. Cl.
*F28D 19/02* (2006.01)
*F28D 13/00* (2006.01)

(52) U.S. Cl.
CPC .............. *F28D 19/02* (2013.01); *F28D 13/00* (2013.01)

(58) Field of Classification Search
CPC ........ F28D 19/02; F28D 13/00; F28D 17/005; F28D 20/0043; F28D 20/02; F28D 2021/0045
USPC ..................................................... 165/104.14
See application file for complete search history.

(56) References Cited

U.S. PATENT DOCUMENTS

| 4,361,009 A | 11/1982 | Schluderberg |
| 4,598,766 A * | 7/1986 | Michalak ................ F28D 13/00 261/157 |
| 5,944,089 A | 8/1999 | Roland |
| 7,958,885 B2 | 6/2011 | Leifer |
| 2012/0180988 A1* | 7/2012 | LaForce ................. F25J 1/0017 165/104.13 |
| 2017/0261268 A1 | 9/2017 | Barmeier et al. |
| 2019/0093959 A1 | 3/2019 | Yue et al. |
| 2020/0124356 A1 | 4/2020 | Ma et al. |
| 2020/0149825 A1* | 5/2020 | Liu ......................... F28D 19/02 |
| 2020/0182558 A1 | 6/2020 | Alsadah et al. |

(Continued)

FOREIGN PATENT DOCUMENTS

EP 3 193 117 A1 1/2017

OTHER PUBLICATIONS

International Search Report and Written Opinion for International (PCT) Application PCT/US21/43377, dated Dec. 27, 2021, pp. 1-8.

(Continued)

*Primary Examiner* — Jon T. Schermerhorn, Jr.
(74) *Attorney, Agent, or Firm* — Alexandra M. Hall; Michael A. McIntyre

(57) ABSTRACT

The present disclosure relates to particle-based thermal energy storage (TES) systems employed for the heating and cooling applications for residential and/or commercial buildings. Particle-based TES systems may store thermal energy in the particles during off-peak times (i.e., when electricity demand and/or costs are relatively low) and remove the stored thermal energy for heating or cooling applications for buildings during peak times (i.e., when electricity demand and/or costs are relatively high).

15 Claims, 8 Drawing Sheets

(56) References Cited

U.S. PATENT DOCUMENTS

2021/0277877 A1* 9/2021 Li .................... F28D 21/0001
2022/0018603 A1* 1/2022 Ma .................... F28D 20/0056

OTHER PUBLICATIONS

Cabeza et al., "Materials used as PCM in thermal energy storage in buildings: A review", Renewable and Sustainable Energy Reviews, Apr. 2011, vol. 15, No. 3, pp. 1675-1695.
Cavraro et al., "Dynamic Power State Estimation withAsynchronous Measurements", 2019 IEEE Global Conference on Signal and Information Processing (GlobalSIP), Ottawa, Canada, Nov. 2019, NREL/CP-5D00-75064, pp. 1-8.

* cited by examiner

METHODS AND SYSTEMS FOR THERMAL ENERGY STORAGE AND THEIR USE IN BUILDINGS APPLICATIONS

CROSS-REFERENCE TO RELATED APPLICATIONS

This application claims priority from U.S. Provisional Patent Application No. 63/057,715, filed on Jul. 28, 2020, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Residential and commercial buildings account for approximately 40% of the United States' total energy demand and approximately 75% of the United States' total electricity use. This results in an annual national energy bill for buildings of approximately $415 billion. Heating and cooling buildings accounts for approximately half of their energy use.

Renewable, low-cost electricity may be used for heat generation due to the high availability of wind and solar power, thus substituting ordinary heat supplies and thereby contributing to building and cooling sustainably. Thus, there is a need for improved systems and methods that integrate power-to-heat conversion with thermal energy storage (TES) in order to displace natural gas heating and to provide ways to decarbonize building heating and cooling applications.

SUMMARY

An aspect of the present disclosure is a system for using thermal energy storage for a building application, the system including a plurality of particles, a heat pump able to transfer heat to a first heat transfer fluid, and a first heat exchanger able to operate in a charging mode and a discharging mode, in which during the charging mode, the first heat exchanger is configured to facilitate heat transfer between the first heat transfer fluid and the plurality of particles, during the discharging mode, the first heat exchanger is able to facilitate heat transfer between the plurality of particles and a second heat transfer fluid, and the second heat transfer fluid is able to exchange heat with the building application. In some embodiments, the building application is a heating, ventilation, and air conditioning (HVAC) system or a water system. In some embodiments, the first heat exchanger is at least one of a moving bed, a fluidized bed, or a shell and tube heat exchanger. In some embodiments, the system also includes a conveyor able to move the plurality of particles from the first heat exchanger to a silo, and the plurality of particles are able to move from the silo to the first heat exchanger gravitationally. In some embodiments, the silo is a shipping container. In some embodiments, a phase change material is positioned within the silo. In some embodiments, the plurality of particles are able to exchange heat with the phase change material during the charging mode and the discharging mode. In some embodiments, the phase change material is at least one of a paraffin, a salt hydrate, a water-salt solution, or a paraffin salt. In some embodiments, the plurality of particles is at least one of silica, sand, ceramics, rock pellets, or concrete. In some embodiments, the first heat transfer fluid is at least one of glycol, water, air, hydrocarbon oils, or a refrigerant. In some embodiments, the second heat transfer fluid is at least one of glycol, water, air, flue gas, hydrocarbon oils, or a refrigerant. In some embodiments, the heat pump is a chiller configured to cool the first heat transfer fluid. In some embodiments, the system includes a particle heater able to heat the plurality of particles. In some embodiments, the system includes a particle cooler able to cool the plurality of particles.

An aspect of the present disclosure is a method of heating or cooling a building application using a thermal energy storage, the method including, in order, operating a heat pump including a first heat transfer fluid, directing the first heat transfer fluid and a plurality of particles to a first heat exchanger, storing the plurality of particles, sending a second heat transfer fluid and the plurality of particles to the first heat exchanger, and routing the second heat transfer fluid to the building application. In some embodiments, the building application is a heating, ventilation, and air conditioning (HVAC) system or a water system. In some embodiments, operating a heat pump includes transferring heat from an ambient to the first heat transfer fluid. In some embodiments, operating a heat pump includes removing heat from the first heat transfer fluid, in which the heat pump includes a chiller. In some embodiments, routing the second heat transfer fluid to the building application includes sending the second heat transfer fluid into a building heating, ventilation, and air conditioning (HVAC) system. In some embodiments, storing the plurality of particles includes conveying the plurality of particles to a silo, and transferring thermal energy to a phase change material positioned within the silo.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

REFERENCE NUMERALS

Figure 1:
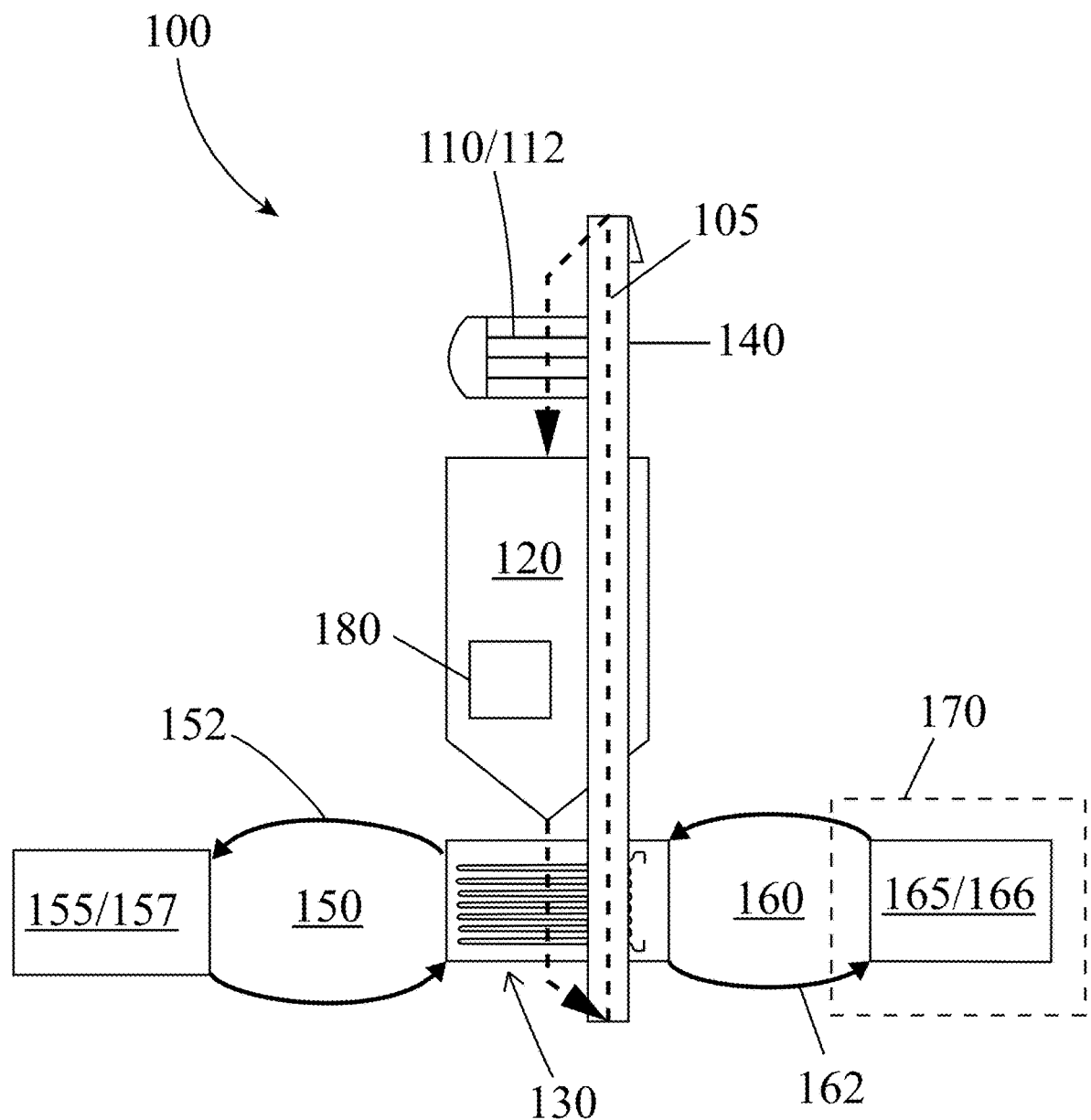
FIG. 1 illustrates a schematic of a particle-based thermal energy storage (TES) system for use in building applications, according to some aspects of the present disclosure.

100 . . . particle-based thermal energy storage (TES) system
105 . . . particles/particle stream
110 . . . particle heater
112 . . . particle cooler
120 . . . silo
140 . . . conveyor
145 . . . heat
150 . . . energy charging loop
151 . . . valve
152 . . . first heat transfer fluid
153 . . . evaporator
154 . . . compressor
155 . . . heat pump
157 . . . chiller
160 . . . energy discharging loop
161 . . . pump
162 . . . second heat transfer fluid
165 . . . HVAC system
166 . . . water system
170 . . . building
172 . . . third heat transfer fluid
180 . . . phase change material
200 . . . second heat exchanger
705 . . . collar
800 . . . method
805 . . . operating
810 . . . directing
815 . . . storing
820 . . . sending
825 . . . routing

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to particle-based thermal energy storage (TES) systems employed for the heating and cooling applications for residential and/or commercial buildings (i.e., building applications). Particle-based TES systems may store thermal energy in particles during off-peak times (i.e., when electricity demand and/or costs are relatively low) and remove the stored thermal energy for building applications (e.g., heating or cooling of the building or the building's water system) during peak times (i.e., when electricity demand and/or costs are relatively high). As shown herein, such particle-based TES systems may 1) increase the energy capacity of a building by allowing grid-supplied energy to be supplemented by stored thermal energy; 2) reduced energy costs by "charging" the TES system during off peak times and "discharging" the TES during peak times (i.e., when energy costs are the highest); and/or 3) provide an alternative heat source to natural gas to heat a building and/or a building's water system. Particle-based TES can store hot and/or cold thermal energy and can operate in all seasons, providing heat in the winter and cooling in the summer. Among other things, particle-based TES may help resolve the power fluctuations resulting from integrating renewable energy sources into the grid and increase the use of the power generated by such renewable sources into building applications by allowing energy generated by renewable sources to be stored as thermal energy in the particles (i.e., charging the particle-based TES system) when it is generated, then used to heat or cool the building or the building's water system (i.e., discharging the particle-based TES system) as needed. In some embodiments, the particle-based TES systems may also include a phase change material (PCM) located in the same storage container as the particles to increase the overall energy storage capacity of the system.

As used herein, "building" may refer to a residential, commercial, and/or industrial structure in the singular or the plural sense (i.e., the term "building" may include multiple interconnected structures, multiple disconnected structures, or a single structure). That is, a single particle-based TES system may be used for heating or cooling building applications in one building or multiple buildings. Similarly, "silo" may refer to a single storage structure or to multiple storage structures or containers. A single particle-based TES system may contain a single silo or multiple silos.

FIG. 1 illustrates an exemplary particle-based TES system 100, according to some embodiments of the present disclosure. Arrows indicate the flow of particles 105 and various heat transfer fluids (first heat transfer fluid 152, second heat transfer fluid 162, and third heat transfer fluid 172) through the particle-based TES system 100. In the exemplary particle-based TES system 100 shown in FIG. 1, a silo 120 may be utilized to store hot and/or cold particles 105. As shown in FIG. 1, a particle-based TES system 100 may have two modes of operation, an energy charging mode accomplished using an energy charging loop 150, and an energy discharging mode accomplished using an energy discharging loop 160. During the charging mode, the energy charging loop 150 may transfer thermal energy (in the form of heating or cooling capacity) from a heat pump 155 or chiller 157 to a first heat transfer fluid 152. The first heat transfer fluid 152 then can transfer that thermal energy to a particle stream 105 in the first heat exchanger 130. During the discharging mode, the energy discharging loop 160 may remove thermal energy from the particles 105 in the first heat exchanger 130 using the second heat transfer fluid 162. The second heat transfer fluid may then be directed to a building application (i.e., the heating, ventilation, and air conditioning (HVAC) system 165 or the water system 166). When discharging the stored heating- or cooling-capacity, the heated or cooled particles 105 are transferred gravitationally to the first heat exchanger 130 to transfer their respective thermal energy to the second heat transfer fluid 162 to provide heating or cooling for building applications, as described herein.

Thermal energy may be in the form of heating capacity or cooling capacity. That is, thermal energy may be in the form of the addition of heat or in the removal of heat. For example, when the thermal energy is hot thermal energy (i.e., heat), the thermal energy stored may be used to heat the building 170 via the HVAC system 165 or heat water via the water system 166. In this example, during the energy charging mode, heat may be transferred from a heat pump 155 to the particles 105 via a first heat transfer fluid 152 in the first heat exchanger 130 Then, when the building 170 requires heating, during the energy discharging mode, the thermal energy stored in the heated particles 105 may be transferred to a second heat transfer fluid 162 contained in the energy discharging loop 160, which is then transferred to the building HVAC system 165 or water system 166 for distribution of the heat 145 to the building 170. In some embodiments of the present disclosure, when charging for storing heating capacity, an electrically powered particle heater 110 may be utilized to produce and transfer high-grade heat directly to the particles 105 (i.e., without the use of an intervening heat transfer fluid).

In some embodiments, the particle-based TES system 100 may utilize the energy charging loop 150 and the energy discharging loop 160 to provide cold thermal energy or cooling capacity (e.g., in the summer) to the building 170. For example, during the charging mode cooling capacity may be provided by a chiller 157 to a first heat transfer fluid 152. The cooled first heat transfer fluid 152 may then be transferred via the energy charging loop 150 to a first heat exchanger 130, which removes heat from the particles 105 to transfer thermal energy to the first heat transfer fluid 152. The cooled particles 105 may then be stored in the silo 120 and provide a heat sink (i.e., cooling capacity) when cooling is required by the building 170. When this occurs, the heat sink provided by the cooled particles 105 may be utilized to remove heat from the building 170 by transferring heat from a second heat transfer fluid 162 to the cooled particles 105 via the energy discharging loop 160 and the first heat exchanger 130. In some embodiments of the present disclosure, the cooled second heat transfer fluid 162 may be a gas that may be directly transferred to the building 170 to provide cooling. In some embodiments of the present disclosure, the cooled second heat transfer fluid 162 may be directed to a building HVAC system 165, which may include a second heat exchanger (200, shown in FIG. 2) and a third heat transfer fluid 172, such that the cooled second heat transfer fluid 162 is directed to the second heat exchanger 200 resulting in the transfer of heat from the third heat transfer fluid 172 to the second heat transfer fluid 162. In the case where the third heat transfer fluid 172 is a gas, the cooled third heat transfer fluid 172 may be directed to the buildings 170 to provide cooling. Generally cooling is not required for building water systems 166, but if it were (e.g., in a very hot summer) the cooling capacity loop could provide cold TES for building water systems 166. In some embodiments, when charging for storing cooling capacity, a particle cooler 112 may be utilized to produce very low temperatures to directly cool the particles 105 (i.e., without the use of an intervening heat transfer fluid).

Figure 3:
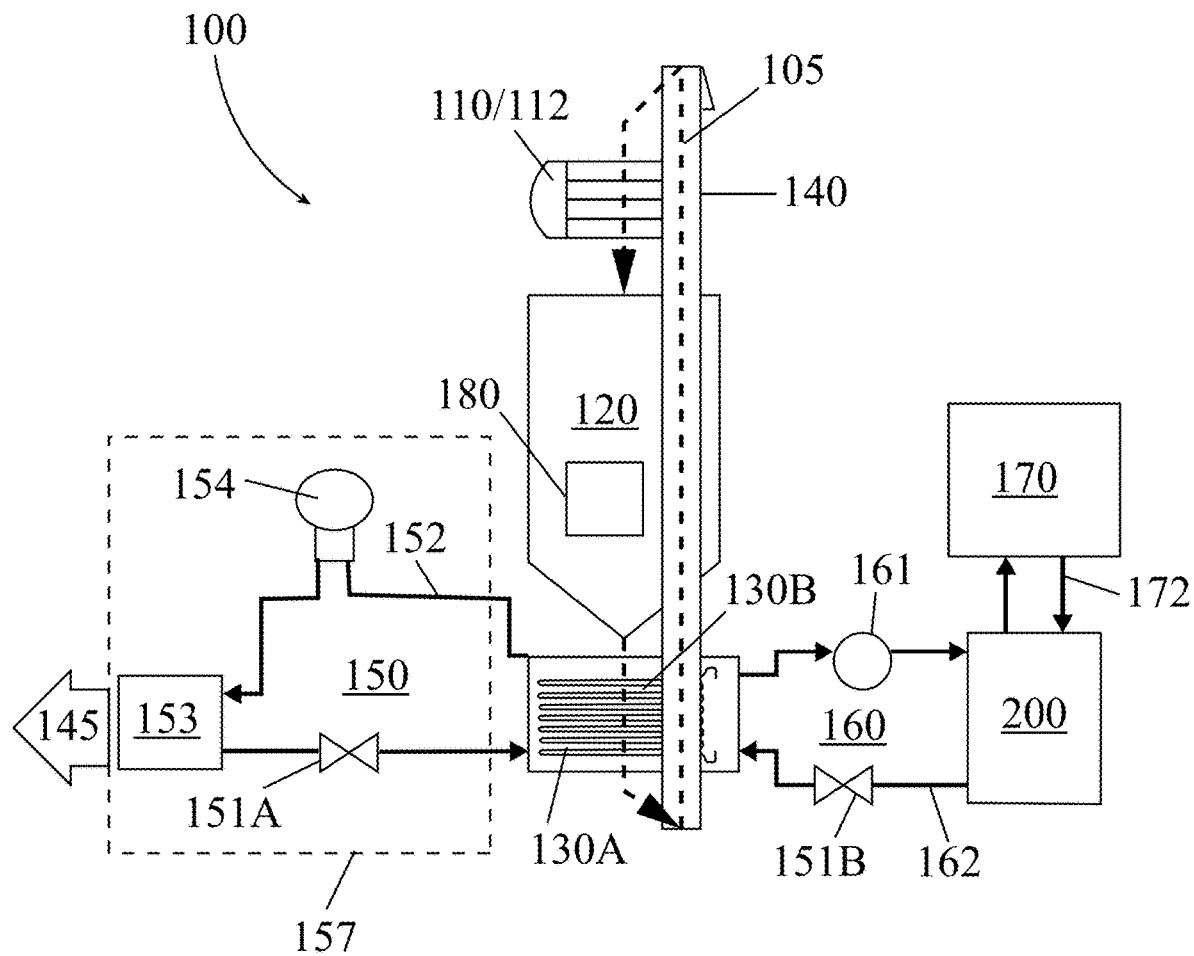
FIG. 3 illustrates a schematic of a particle-based TES system for cooling building applications, according to some aspects of the present disclosure.

As described above, in some embodiments of the present disclosure, in addition to a heat pump 155 or in place of a heat pump, a particle-based TES system 100 may be designed to include a chiller 157 (as shown in FIG. 3). The advantages of such a system over incumbent ice storage systems are that the particle-based TES systems 100 described herein are not limited by the freezing or boiling temperature of water and, therefore, can provide a much wider and colder operating/storage temperature and larger cooling capacities. Further advantages are available due to the use of particles 105, which may eliminate the use of a copper cooling loop, which is commonly required in ice storage systems. Thus, the particle-based TES systems 100 described herein, among other things, can provide both heating and cooling to buildings 170, during all seasons, in some instances while utilizing renewable energy sources. The first heat exchanger 130 may be made of a material that is substantially resistant to erosion, such as steel, stainless steel, or aluminum.

In some embodiments of the present disclosure, a particle-based TES system 100 may be combined with a heat pump 155 and/or a chiller 157 to convert electrical energy from the grid and/or renewable energy sources to thermal energy which can be stored in the particles 105 and/or a PCM 180. Large heat pumps 155 enable retrofitting particle-based TES systems 100 with existing buildings because heat pumps 155 in distributed or centralized heating systems. Among other things, particle-based TES systems 100 as described herein can eliminate the use of electric resistance heaters as a backup heat source for buildings 170 in cold weather and may be able to provide or supplement the cooling capacity available to the building 170 during hot periods.

Figure 2:
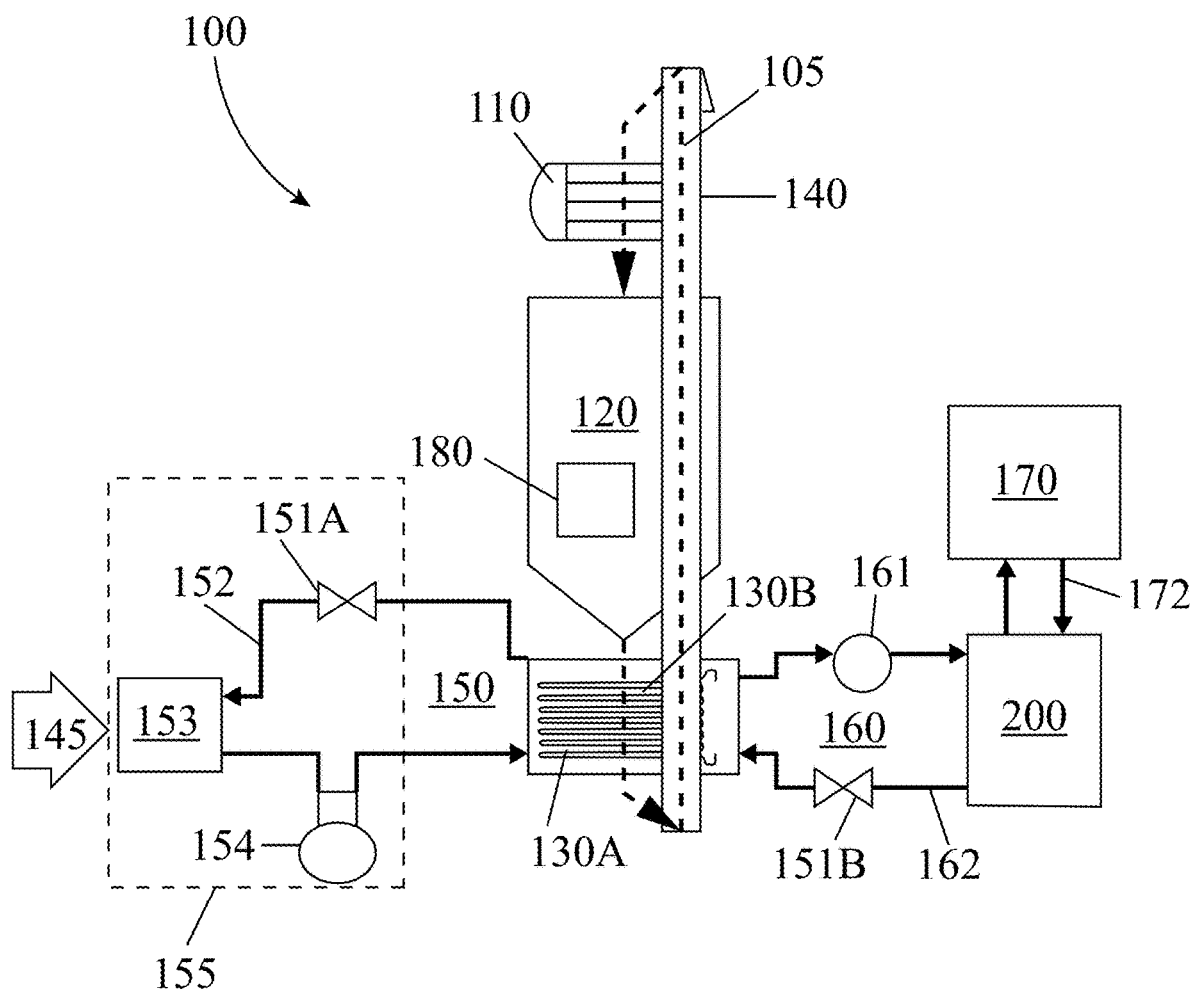
FIG. 2 illustrates a detailed schematic of a particle-based TES system for use in heating building applications, according to some aspects of the present disclosure.

FIG. 2 illustrates a schematic of a particle-based TES system 100 for heating a building or a building's water system, according to some aspects of the present disclosure. FIG. 2 shows a particle-based TES system 100 that provides heat to a building 170, where a heat pump 155 converts electricity to thermal energy and transfers the thermal energy to particles 105 via a first heat transfer fluid 152 contained in an energy charging loop 150 and utilizing a first dedicated portion 130A of a first heat exchanger 130 during the daytime when high ambient temperatures are available. The heat 145 transferred to and stored in the particles 105 may then be utilized to heat the building 170 during periods of colder temperatures (e.g., nighttime). FIG. 2 also illustrates that during discharge, a second dedicated portion 130B of the first heat exchanger 130 may be utilized to transfer heat from the particles 105 to a second heat transfer fluid 162 contained in an energy discharging loop 160. The resulting heated second heat transfer fluid 162 may then be transferred (utilizing a pump 161) to a second heat exchanger 200, where heat is transferred from the second heat transfer fluid 162 to a third heat transfer fluid 172, which is then delivered to the building 170 to heat the building's HVAC system 165 or water system 166.

FIG. 3 illustrates a schematic of a particle-based TES system 100 for cooling a building or a building's water system, according to some aspects of the present disclosure. In this example, a chiller 157 may be employed to cool a first heat transfer fluid 152 contained in an energy charging loop 150, for example during cool ambient temperatures such as at night. The resultant cooled first heat transfer fluid 152 may then be directed to a first portion 130A of a first heat exchanger 130 to transfer heat 145 from particles 105 to the cooled first heat transfer fluid 152, thereby cooling the particles 105. The particles 105 may then be stored in the silo 120 until the building 170 requires cooling capacity (e.g., during the heat of the day). Then, the cooled particles 105 may be utilized as a heat sink by directing them to a second portion 130B of the first heat exchanger 130, in which heat 145 is transferred from a second heat transfer fluid 162 contained in an energy discharging loop 160, thereby heating the particles 105 and cooling the second heat transfer fluid 162. The cooled second heat transfer fluid 162, now a heat sink itself, may subsequently be directed to a second heat exchanger 200 in which heat is transferred from a third heat transfer fluid 172, (e.g., air) to the second heat transfer fluid 162. This results in the cooling of the third heat transfer fluid 172, which may then be directed to the building 170 to cool the building HVAC system 165 or water system 166.

As shown herein, the direct particle 105 storage-building coupling configuration simplifies the control strategy. A particle-based TES system 100 can be designed to operate such that heating/cooling can bypass the heat pump 155 and directly integrate with a particle-based TES energy supply, (e.g., electric particle heater 110). This configuration can separate the heat pump 155 operation from the building 170 electrical load. This may enable the heat pump 155 to work at an optimum condition to charge particle-based TES, further enabling the particle-based TES system 100 to discharge energy (i.e., heat or cooling capacity) as required by the load requirement of the building 170.

In some embodiments of the present disclosure, a particle-based TES system 100 may be designed as a hybrid operation combines a heat pump 155 with energy storage to supply building heating/cooling and water system heating/cooling. Such a particle-based TES system 100 may be optimized to meet economic objectives by sizing the components of the particle-based TES system 100 as needed. As shown herein, such an integrated particle-based TES system 100, among other things, can avoid oversizing the particle-based TES to meet a peak demand. Regardless, the design of a particle-based TES system 100 will depend on the economic and operational objectives, the targeted capacity and loads, and a variety of other design criteria.

Figure 4:
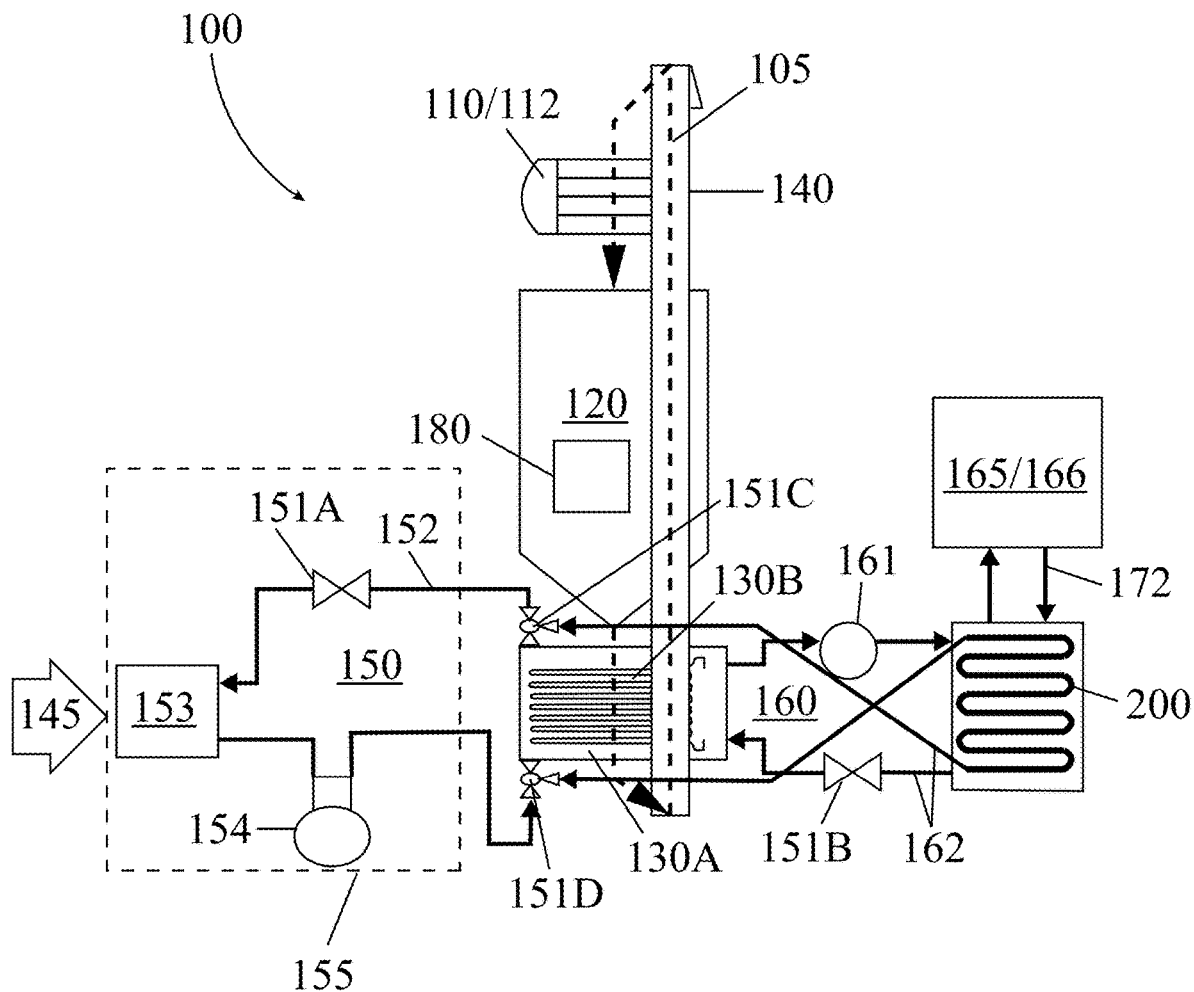
FIG. 4 illustrates a schematic of a particle-based TES system for heating building applications, showing in detail the discharging loop, according to some aspects of the present disclosure.

FIG. 4 illustrates a schematic of a particle-based TES system 100 for heating a building or a building's water system, showing in detail the discharging loop, according to some aspects of the present disclosure. The particle-based TES system 100 shown in FIG. 4 illustrates a hybrid heat pump 155/particle storage-building system during heating mode, while a heat pump 155 provides a heating capacity during high ambient temperatures (e.g., during the day), after which, both the heat pump 155 and the thermal energy stored in the particles 105 may be used to heat a building 170 during colder periods of time (e.g., during nighttime).

FIG. 4 illustrates how the first heat exchanger 130 can operate both the charging loop 150 and the discharging loop 160 using valves 151C and 151D to control the flow of the first heat transfer fluid 152 and the second heat transfer fluid 162 In some embodiments, the second heat transfer fluid can circle between the second heat exchanger 200 where it can exchange heat with the third heat transfer fluid 172 and the first heat exchanger 130, where it can exchange heat with the particles 105. A pump 161 and a valve 151B can assist in this circling. The valves 151C and 151D can allow the first heat transfer fluid 152 to enter the first heat exchanger 130 and prevent the second heat transfer fluid 162 from entering the first heat exchanger 130 during the charging mode then allowing the second heat transfer fluid 162 to enter the first heat exchanger 130 and prevent the first heat transfer fluid 152 from entering the first heat exchanger 130 during the discharging mode.

Figure 5:
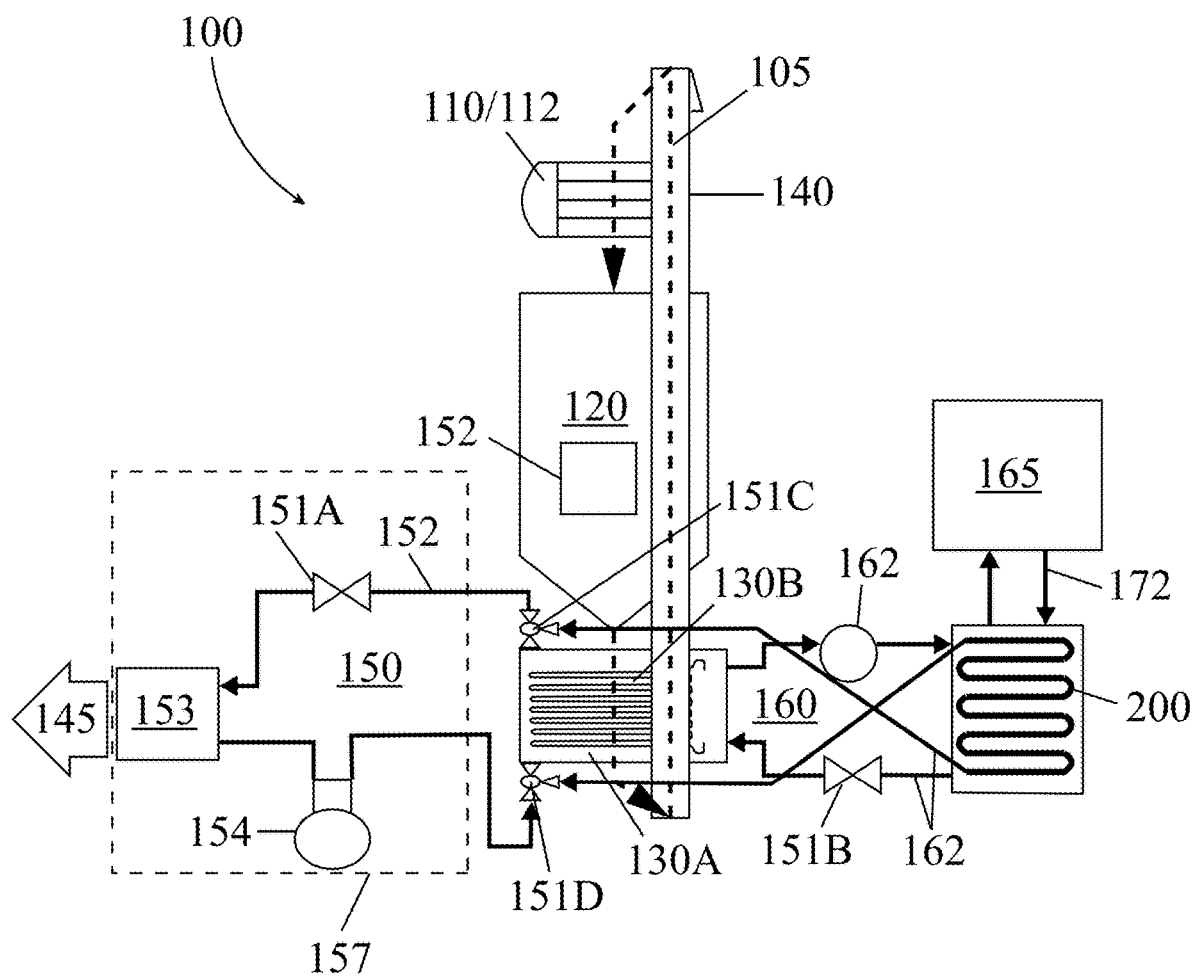
FIG. 5 illustrates a schematic of a particle-based TES system for cooling building applications, according to some aspects of the present disclosure.

FIG. 5 illustrates a schematic of a particle-based TES system 100 for cooling a building or a building's water system, according to some aspects of the present disclosure. In this example, a heat pump 155 and/or chiller 157 may provide cooling capacity to the particles 105 during low ambient temperatures and low electric costs (e.g., at night). Subsequently, the heat pump 155 and/or chiller 157 in combination with the cooling capacity stored in the particles 105 may be utilized to cool the building 170 (e.g., during the heat of the day).

Figure 6:
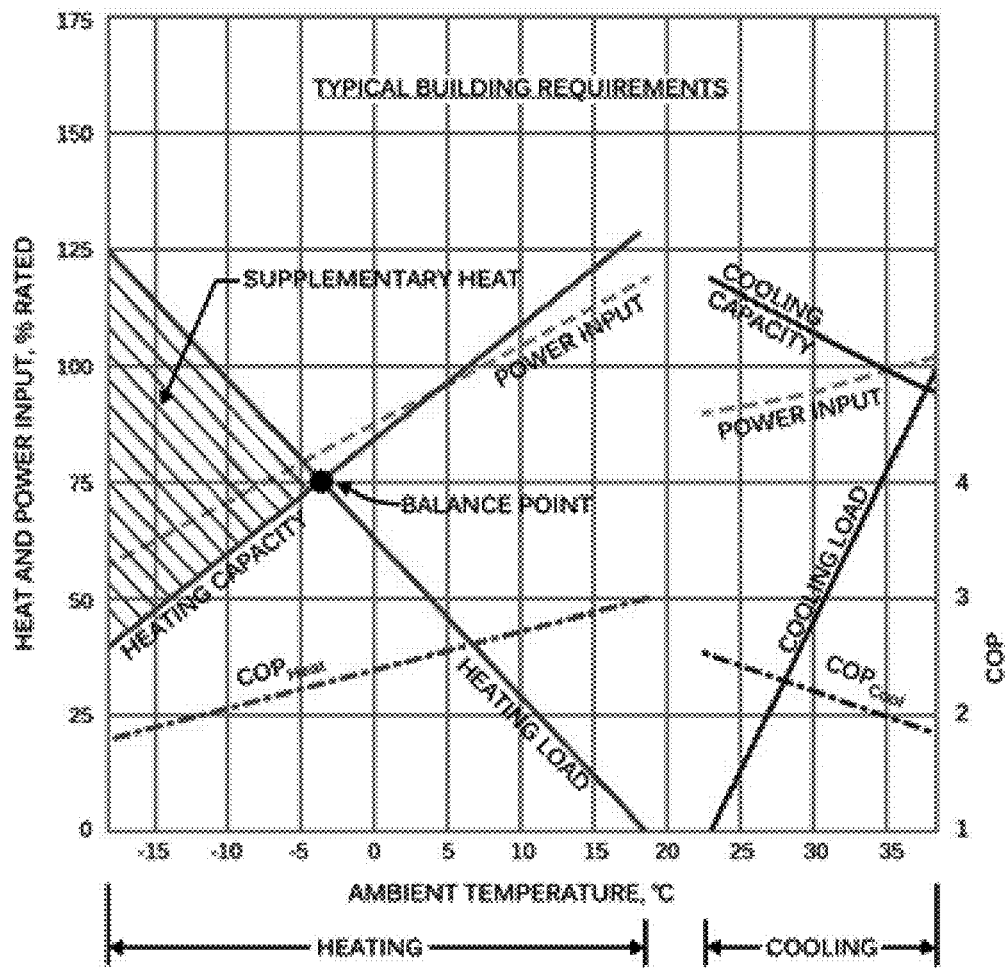
FIG. 6 illustrates HVAC capacities and load demands and demonstrates how the particle-based TES systems described herein have numerous advantages over incumbent HVAC technologies.

FIG. 6 illustrates HVAC capacities and load demands and how the particle-based TES systems 100 described herein have numerous advantages over incumbent HVAC technologies. As shown in FIG. 6, typical building 170 requirements for heating and cooling include heating loads and cooling loads that vary with the ambient temperature (i.e., a greater heating load is required with cooler ambient temperatures). However, the heating load and cooling load are often approximately the inverse of the heating capacity and the cooling capacity, respectively (i.e., as the heating load increases the heating capacity decreases at lower ambient temperatures). The supplemental heat provided by particle-based TES systems 100 as described herein, may allow a balance point to be found for heating requirements. The same is true for the supplemental cooling provided by the particle-based TES systems 100 as described herein for cooling requirements, although that is not shown in FIG. 6. The balance point shows the intersection of the heating load and heating capacity and is less that typical power inputs for building systems.

As shown in FIG. 6, due to the opposite direction between the HVAC capacity and load that both are affected by the ambient temperatures, conventional HVAC systems either need to be over-designed to meet capacity, or they must use supplementary heat to make up the deficit between energy demand and supply, which results in high equipment costs and energy consumption. The particle-based TES systems 100 described herein are more efficient and cost-effective because, among other things, they operate at an optimum ambient temperature during both heating and cooling cycles and shift the balance point to favor smaller sized heat pumps.

Figure 7:
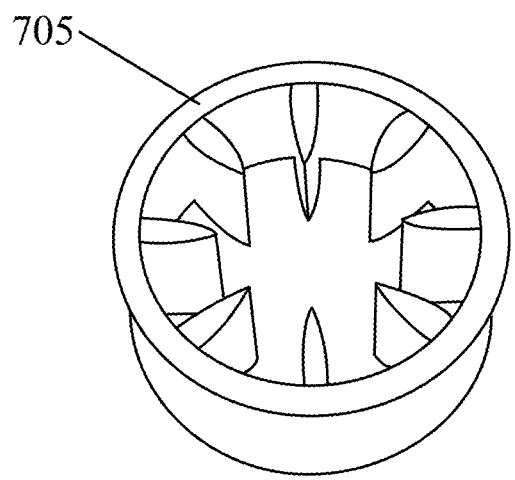
FIG. 7 illustrates a device for supporting a phase change material stored inside a silo with particles as a part of a particle-based TES system for use in building applications, according to some aspects of the present disclosure.

FIG. 7 illustrates a device (i.e., a collar 705) for supporting a phase change material (PCM) inside a silo 120 with particles 105 as a part of a particle-based TES system 100, according to some aspects of the present disclosure. The collar 705 may hold or support a PCM 180 (not shown in FIG. 7) within the silo 120 such that the PCM 180 and particles 105 may be capable of exchanging heat (i.e., be in thermal communication). The PCM 180 may allow a greater amount of thermal energy to be stored in the silo 120 by storing thermal energy in both the PCM 180 and the particles 105.

Figure 8:
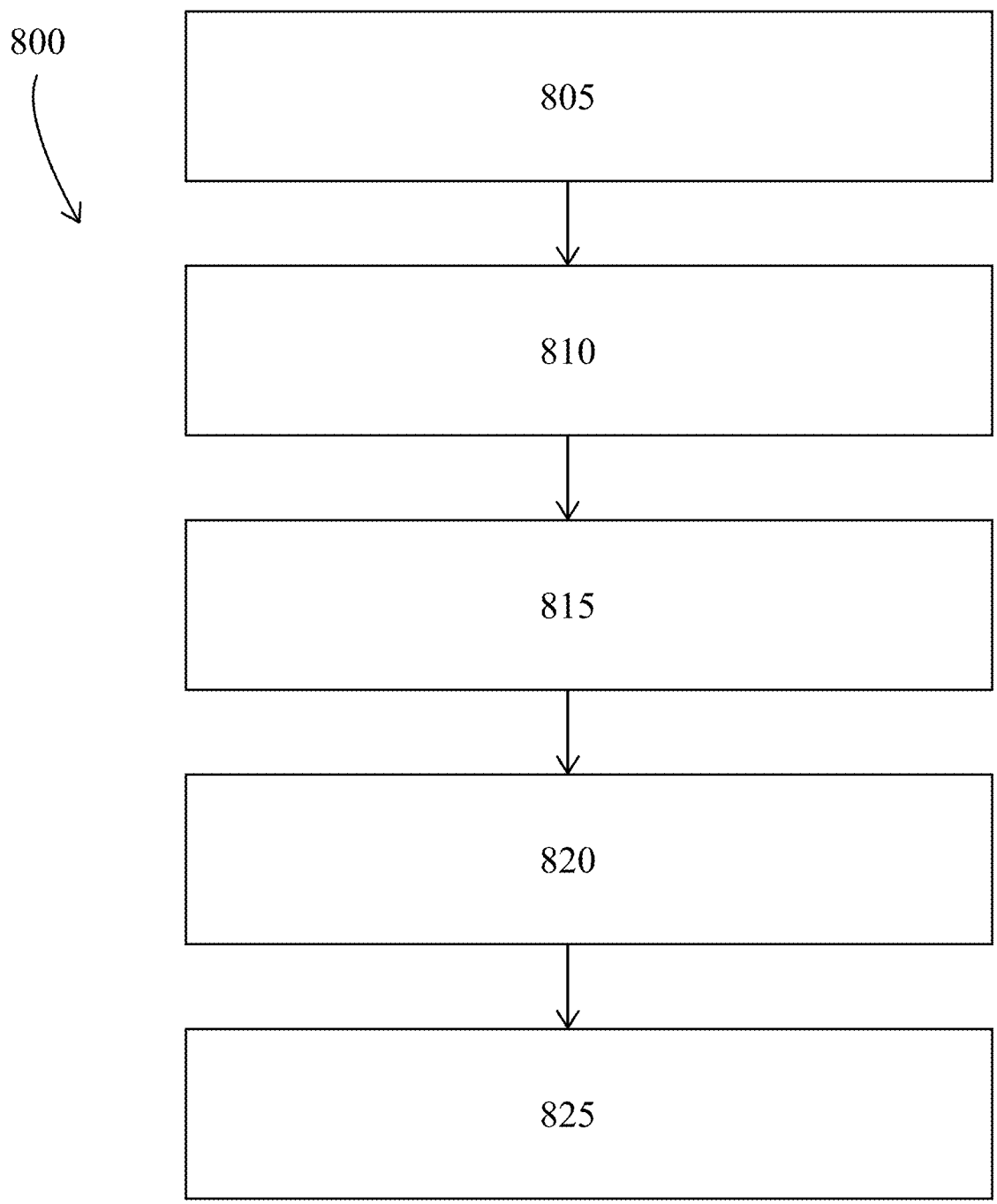
FIG. 8 illustrates a method of utilizing particle-based TES for building applications, according to some aspects of the present disclosure.

FIG. 8 illustrates a method 800 of utilizing particle-based thermal energy storage to heat a building 170 (via a HVAC system 165) or a building's water system 166, according to some aspects of the present disclosure. The method 800 first includes operating 805 a heat pump 155 which includes a circulating first heat transfer fluid 152. The heat pump 155 may pull heat from the ambient when it is hot outside or convert electrical energy to thermal energy. The heat may be transferred to the first heat transfer fluid 152.

The method 800 next includes directing 810 the first heat transfer fluid 152 and the particles 105 to the first heat exchanger 130. This allows the heat from the first heat transfer fluid 152 to transfer to the particles 105 (i.e., the thermal energy transfers from the first heat transfer fluid 152 to the particles 105). The operating 805 and directing 810 may combine to effectively "charge" the particle-based TES system 100 with thermal energy. In some embodiments, the charging/discharging power capacities may be separated from the storage capacity and can be flexibly designed based on heat exchanger sizes. In some embodiments, the particles 105 may be further heated by a particle heater 110 prior to entering the silo 120.

The method 800 next includes storing 815 the particles 105 in a storage container, such as the silo 120. That is, the storing 815 includes storing the thermal energy in the silo 120. This may be done until the thermal energy is needed. The storing 815 be for a period of time in the range of about 30 minutes to about 12 months. In some embodiments of the present disclosure, the storing 815 also includes using a PCM 180 positioned within the silo 120 to store 815 thermal energy. That is, during the storing 815, the particles 105 may transfer thermal energy (i.e., heat) to the PCM 180 in the silo 120. The operating 805, directing 810, and storing 815 may be said to "charge" the particle-based TES system 100 by (in combination) converting electrical energy to thermal energy, transferring thermal energy to the particles 105, and then placing the particles 105 in a silo 120.

In some embodiments, a lock hopper may be used to control the flow of the particles 105 to the silo 120 or to temporarily hold the particles 105 before storing the particles 105 in the silo 120. A mechanical valve, non-mechanical valve, a chute, a conveyor, or other method may be used to transport the particles 105 between the silo 120, the first heat exchanger 130, and/or the lock hopper.

The method 800 next includes sending 820 a second heat transfer fluid 162 and the particles 105 to the first heat exchanger 130. The sending 820 allows the thermal energy to be transferred from the particles 105 to the second heat transfer fluid 162. In some embodiments, thermal energy stored in the PCM 180 may be transferred to the particles 105 in the silo 120, then transferred from the particles 105 to the second heat transfer fluid 162. The sending 820 may be said to "discharge" the particle-based TES system 100 by transferring the thermal energy to the second heat transfer fluid 162, which may then transfer the thermal energy to the building 170 (via the heating, ventilation, and air conditioning (HVAC) system 165 or the water system 166) or may enter a turbine (not shown) to convert the thermal energy to electrical energy for use in the building 170.

The method 800 next includes routing 825 the second heat transfer fluid 162 to either the HVAC system 165 of a building 170 or the water system 166 of a building 170. In some embodiments, the second heat transfer fluid 162 may be routed through a second heat exchanger 200 to heat the HVAC system 165 or water system 166 directly or to transfer thermal energy to a third heat transfer fluid 172 for use in the HVAC system 165 or water system 166.

In some embodiments, the particle-based TES systems 100 may use waste heat and/or heat generated by industrial or combined heat-power (CHP) generation systems. That is, in some embodiments, the heat stored in the particles 105 as thermal energy may be industrial waste heat. This may be used in place of energy from the grid to "charge" the particle-based TES system. In this example, flue gas from industrial processes could be used as a first heat transfer fluid 152 to heat the particles 105.

In some embodiments of the present disclosure, the silo 120 may be a conventional container to store hot/cold particles 105 in a single layered thermocline (i.e., single temperature stratified) storage system. The silo 120 may be approximately the same size as a shipping container (i.e., approximately 8 to 9.5 ft wide and either 20 or 40 ft long). The silo 120 may be substantially cylindrical, rectangular cuboid, or other shape. In some embodiments, the silo 120 may be a tower silo of substantially cylindrical shape, a bunker silo of a trench with insulative (e.g., concrete) lining, a bin with a substantially square or rectangular cross section, and/or another storage container. The silo 120 may be made of a material that is substantially resistant to erosion, such as steel, stainless steel, or aluminum. To prevent heat loss, the silo 120 may be insulated with an insulative material, such as mineral wool, or a refractory material, such as calcium silicate. Multiple silos 120 may be utilized based on the desired TES capacity of the particle-based TES system 100, the number of buildings 170 to utilize the stored thermal energy, and/or the type of particles 105 used.

In some embodiments of the present disclosure, the first heat exchanger 130 may be integrated within the silo 120. In some embodiments of the present disclosure, the first heat exchanger 130 and/or the second heat exchanger 200 may include at least one of a moving bed and/or a fluidized bed. In some embodiments, the first heat exchanger 130 may be multiple heat exchangers, if condensing the system to reuse the same equipment is not desired. In some embodiments, the first heat exchanger 130 may be divided into portions for use by the energy charging loop 150 and the energy discharging loop 160, as shown in FIGS. 4 and 5 by 130A and 130B. The first heat exchanger 130 may contain a moving bed, a pressurized fluidized bed, and/or a shell and tube configuration for transferring heat between the particles 105 and the first heat transfer fluid 152 and/or the second heat transfer fluid 162.

In some embodiments, the particle heater 110 may be a resistive heater which may contact the particles 105 directly with a heating element (i.e., not a heat transfer fluid). Similarly, in some embodiments, the particle cooler 112 may be a Peltier cooler, thermoelectric heat pump, thermoelectric battery. The particle heater 110 and/or particle cooler 112 may use conductive heat transfer to supply/remove heat from the particles 105 as appropriate.

The particles 105 described herein may utilize sensible heat for energy storage and can safely operate (i.e., be inert or nonreactive) at a wide temperature range. The particle-based TES systems 100 described herein are safe, chemically stable, and do not pose health or fire concerns when utilized to heat/cool commercial or residential buildings 170. The particle-based TES systems 100 described herein can provide significant energy savings, improve grid performance, and enable the use of renewable energy, thus lowering the amount of fossil fuels utilized to provide HVAC and hot water to buildings. The particles 105 may be a substantially inert material, such as silica sand, rock pellets, alumina balls, coal ash, calcined flint clay, brown fused alumina, ceramics, concrete, gravel, and/or cenospheres. In some embodiments, a phase change material (PCM) 180 may be stored with the particles 105 in the silo 120. In some embodiments, a PCM 180 may be embedded within the particles 105 themselves. The PCM 180 may be at least one of a paraffin, a salt hydrate, a water-salt solution, and/or a paraffin salt. In some embodiments, the PCM 180 may be contained within a conductive casing or shell to prevent the PCM from mixing freely with the particles 105.

In some embodiments, for use in heating applications, the temperature to which the heat pump 155 and/or the particle heater 110 may heat the particles 105 may be in the range of about 200° C. to about 1200° C. In some embodiments, for use in cooling applications, the temperature to which the chiller 157 and/or the particle cooler 112 may cool the particles 105 may be in the range of about −50° C. to about 250° C.

In some embodiments, the first heat transfer fluid 152, the second heat transfer fluid 162, and the third heat transfer fluid 172 may be at least one of air, gas media, glycol, refrigerant, water, steam, flue gas, or hydrocarbon oils in a gas, fluid, and/or fluid-gas mixture form. In the case where the heated third heat transfer fluid 172 is a gas, the heated third heat transfer 172 may then be directed to the building 170. In some embodiments of the present disclosure, the second heat transfer fluid 162 may be a gas such that the second heat transfer fluid 162 itself is directed to the building 170 to provide heating. Note that the three heat transfer fluids (the first heat transfer fluid 152, the second heat transfer fluid 162, and the third heat transfer fluid 172) may not be the same fluid and/or gas.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A system for using thermal energy storage for a building application, the system comprising:
   a plurality of particles;
   a silo;
   a heat pump configured to transfer heat to a first heat transfer fluid;
   a first heat exchanger configured to operate in a charging mode and a discharging mode;
   a conveyor configured to move at least some of the particles from the silo along a particle stream from the first heat exchanger to the silo;
   a phase change material positioned within the silo; and
   a particle cooler and a particle heater located along the particle stream downstream from the first heat exchanger, the particle heater and particle cooler configured to cool or heat at least some of the particles before said particles return to the silo; wherein:
   during the charging mode, the first heat exchanger is configured to receive at least some of the particles from the silo and facilitate heat transfer between said particles and the first heat transfer fluid,
   during the discharging mode, the first heat exchanger is configured to receive at least some of the particles from the silo and facilitate heat transfer between the said particles and a second heat transfer fluid,
   the system is configured to exchange heat between at least some of the particles and the phase change material during the charging mode and during the discharging mode, and
   the system is configured to exchange heat between the second heat transfer fluid and the building application.

2. The system of claim 1, wherein the building application comprises a heating, ventilation, and air conditioning (HVAC) system or a water system.

3. The system of claim 1, wherein the first heat exchanger is at least one of a moving bed, a fluidized bed, or a shell and tube heat exchanger.

4. The system of claim 1, wherein the silo is a shipping container.

5. The system of claim 1, wherein the phase change material is at least one of a paraffin, a salt hydrate, a water-salt solution, or a paraffin salt.

6. The system of claim 1, wherein the plurality of particles are at least one of silica, sand, ceramics, rock pellets, or concrete.

7. The system of claim 1, wherein the first heat transfer fluid is at least one of glycol, water, air, hydrocarbon oils, or a refrigerant.

8. The system of claim 1, wherein the second heat transfer fluid is at least one of glycol, water, air, flue gas, hydrocarbon oils, or a refrigerant.

9. The system of claim 1, wherein the heat pump is a chiller configured to cool the first heat transfer fluid.

10. A method of using the system according to claim 1 to heat or cool a building application, the method comprising:
    directing the first heat transfer fluid and at least some of the particles to the first heat exchanger;
    storing the plurality of particles; and
    sending the second heat transfer fluid and at least some of the particles to the first heat exchanger.

11. The method of claim 10, wherein the building application comprises a heating, ventilation, and air conditioning (HVAC) system or a water system.

12. The method of claim 10, wherein operating the heat pump comprises transferring heat from an ambient to the first heat transfer fluid.

13. The method of claim 10, wherein operating the heat pump comprises removing heat from the first heat transfer fluid, wherein the heat pump is a chiller.

14. The method of claim 10, wherein:
routing the second heat transfer fluid to the building application comprises:
sending the second heat transfer fluid into a building heating, ventilation, and air conditioning (HVAC) system.

15. The method of claim 10, wherein storing the plurality of particles comprises:
conveying the plurality of particles to the silo, and
transferring thermal energy to the phase change material positioned within the silo.

* * * * *